United States Patent [19]
Zemel

[11] Patent Number: 4,980,646
[45] Date of Patent: Dec. 25, 1990

[54] IMPEDANCE TOMOGRAPHIC TACTILE SENSOR

[75] Inventor: Jay N. Zemel, Jenkintown, Pa.

[73] Assignee: The Trustees of the University of Pennsylvania, Philadelphia, Pa.

[21] Appl. No.: 175,348

[22] Filed: Mar. 30, 1988

[51] Int. Cl.⁵ .............................................. G01R 27/08
[52] U.S. Cl. ...................................... 324/716; 178/18; 324/699; 324/71.1; 338/94; 338/114; 340/712; 901/33
[58] Field of Search ...................... 324/64, 65 R, 65 P, 324/65 CP, 63, 62, 71.1, 716, 691, 699, 701, 713; 901/33; 414/5; 338/114, 111, 222, 80, 99, 94, 38, 44; 340/870.38, 712; 178/18

[56] References Cited

U.S. PATENT DOCUMENTS

| | | | |
|---|---|---|---|
| 4,767,973 | 8/1988 | Jacobson et al. | 324/457 X |
| 4,775,765 | 10/1988 | Kimura et al. | 338/99 X |
| 4,814,760 | 3/1989 | Johnston et al. | 178/18 X |

FOREIGN PATENT DOCUMENTS

| | | | |
|---|---|---|---|
| 0816963 | 3/1981 | U.S.S.R. | 901/33 |
| 1074711 | 2/1984 | U.S.S.R. | 901/33 |
| 1271743 | 11/1986 | U.S.S.R. | 901/33 |

*Primary Examiner*—Reinhard J. Eisenzopf
*Assistant Examiner*—Robert W. Mueller
*Attorney, Agent, or Firm*—Nixon and Vanderhye

[57] ABSTRACT

Disclosed is a container holding a partially conductive ionic fluid with a flexible tactile surface covering the fluid and sealing the container. Along the bottom of the container a series of parallel conductors are located with the farthest spaced apart conductors being connected to a voltage source. Measurements of changes in voltages between individual pairs of conductors will provide an indication of any localized deformation of the flexible tactile surface. Such a tactile sensor can be utilized in any device where an electrical output is desired which is indicative of the surface or surface characteristics of the object to be contacted.

14 Claims, 2 Drawing Sheets

IMPEDANCE TOMOGRAPHIC TACTILE SENSOR

BACKGROUND OF THE INVENTION

1. Field of the Invention

The invention relates generally to sensors that produce an output indicating pressure and position and more specifically to that class of position sensors known as tactile sensors which provide information on the local geometry of a surface.

2. Description of the Prior Art

Tactile sensors are generally known and can be grouped into a number of different categories depending upon their construction, the most common groups are piezoresistive, piezoelectric, capacitive and elastoresistive structures. The common feature of all of these devices is the transduction of local asperities (unevenness or a projection from a surface) into electrical signals. Tactile sensors are commonly used in the field of robotics and in particular with those robotic devices which pick up and place objects in accordance with programmed instructions; the so-called "pick and place" class of robot. Unfortunately, while it would be desirable for the above-listed groups of tactile sensors to respond in much the same way that the human finger does, many of them can provide only limited information about a contact with an object. This requires large numbers of separate structures or electrical characteristics that require extensive circuitry in order to obtain an output indicative of the surface which has been contacted. For robotics, the difficulties associated with their non-linear response mechanisms, their fragile structure and the high cost of assembling many discrete components limits their use of the above groups in an industrial environment. And if their use is not prohibited, there are difficulties with calibration, environmental survivability, etc. which render them less than optimum for the application.

SUMMARY OF THE INVENTION

In accordance with the above, it is an object of the present invention to provide a tactile sensor which is both rugged and sensitive to contact with an external object.

It is a further object of the present invention to provide a tactile sensor whose electronic output is linear in nature and does not require a large quantity of computational support in order to determine contacted surface characteristics.

The above and other objects are achieved in accordance with the present invention by providing an enclosure containing at least a partially conductive fluid with said enclosure having at least one flexible tactile surface with the enclosed fluid being essentially a constant volume thereunder. An array of parallel conductors are provided along a plane parallel to the flexible tactile surface and the outermost two conductors are connected to a voltage supply source. When energized and no deformation or indentation of the flexible tactile surface has occurred, there will be a voltage drop across adjacent conductors which can be measured with a simple volt meter. However, if the flexible tactile surface is indented at a location, between the furthest spaced apart conductors, the thickness of the fluid between the flexible tactile surface and local pairs of conductors will change. If the thickness decreases, the local impedance to current flow will increase, increasing the voltage drop measured across the local pair of conductors, thus providing an indication of the position of the indentation and the extent to which the tactile surface has been indented. Multiple indentations can be shown as well.

BRIEF DESCRIPTION OF THE DRAWINGS

The present invention will be better understood by reference to the following exemplary drawings wherein:

FIG. 1b is a side cross-sectional view of the embodiment shown in FIG. 1a;

FIG. 2c illustrates the response of the present invention to an indentation on the left side of FIG. 1a; and FIG. 2d illustrates the response of the present invention to an indentation on the right side of FIG. 1a.

DETAILED DESCRIPTION OF THE PREFERRED EMBODIMENT

Figure 1A:
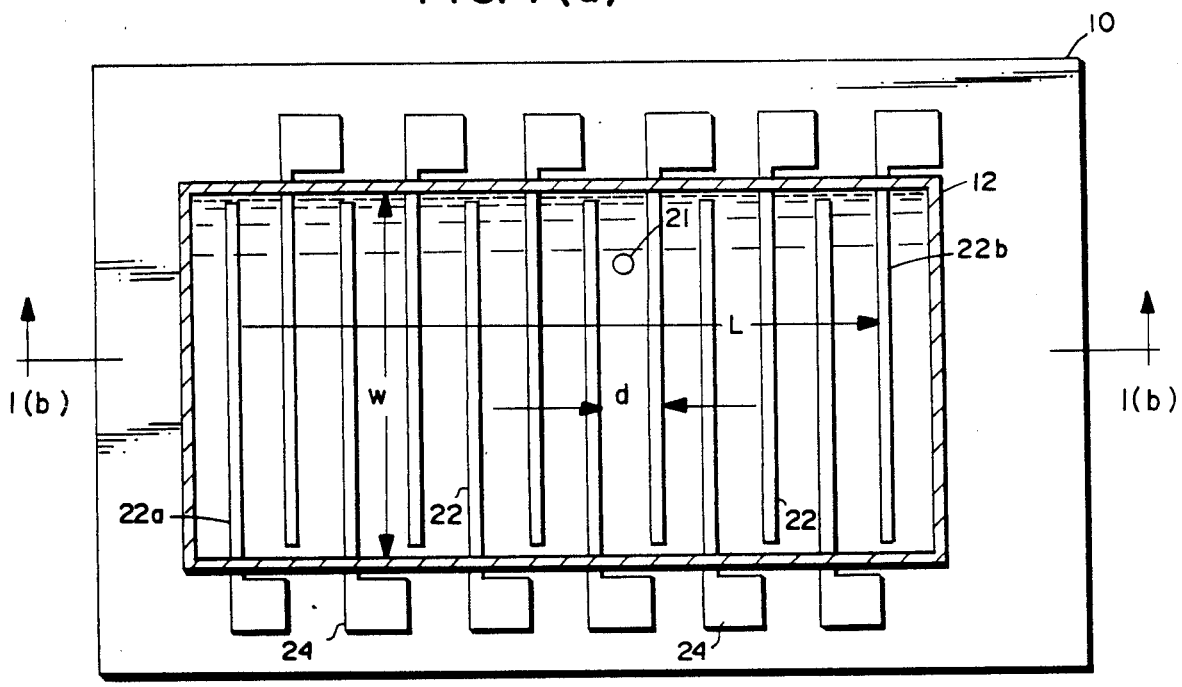
FIG. 1a is a top cross-sectional view of one embodiment of the present invention.
Figure 1B:
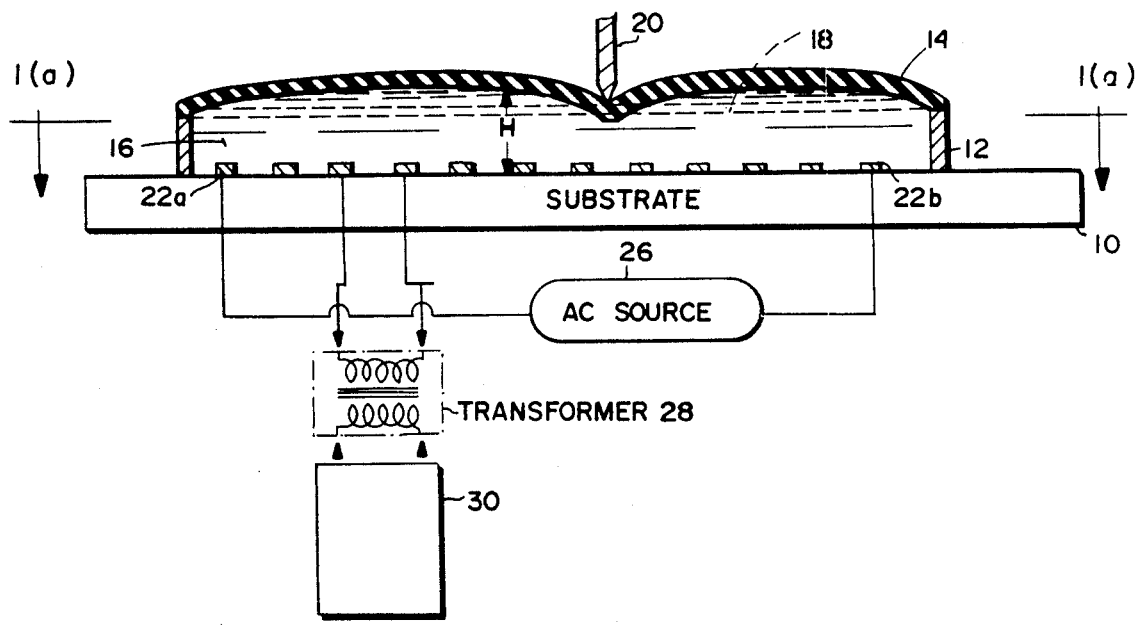

FIG. 1a is essentially a top cross-sectional view of one embodiment of the present invention. A substrate 10 is comprised of a ceramic surface having an enclosure 12 which defines the periphery of the tactile sensor. Both the substrate and the peripheral frame may be made of densified $Al_2O_3$ which in a preferred embodiment can be about 2 millimeters thick. A flexible tactile surface 14 is attached to the upper portion of frame 12 and covers the entire frame and an at least partially conductive liquid 16 fills the volume bounded by the substrate 10, the frame 12 and the flexible tactile surface 14. In a preferred embodiment the conductive fluid 16 is liquid, undiluted commercial ethylene glycol, commonly used as automotive antifreeze. In a preferred embodiment the flexible tactile surface 14 is a piece of surgical glove latex. In FIG. 1b the undeformed position of flexible tactile surface 14 is shown by dotted lines 18 although the surface is drawn in its shape as deformed by indentor 20 at position 21.

Conductor array 22 is shown with connective pads 24. In a preferred embodiment, the conductor array may be formed of a layer of chromium (Cr) 10 nm (to improve adhesion) and gold (Au) 300 nm (to improve conductivity) produced by photolithography. The actual embodiment of the invention was tested having a length L equal to 1 cm, a width W equal to 1 cm and a liquid height approximately equal to 2 mm and the results of this embodiment are shown in FIGS. 2a through 2d. However, for clarity of understanding, FIGS. 1a and 1b are shown with the length substantially longer than the width. It should be understood that the dimensions are not critical and any length, width or height of fluid could be utilized depending upon the tactile sensor requirement. It will be seen that the conductors are spaced apart in a direction which is substantially parallel to the tactile surface and that two of the conductors 22a and 22b are spaced furthest apart at opposite ends of the array. A voltage source, in a preferred embodiment AC source 26, provides a voltage drop across the furthest spaced apart conductors 22a and 22b.

If the conducting fluid has a resistivity of p and the applied voltage is V then the resulting current I is given by:

$$I = \frac{HW}{pL} V \quad (1)$$

In view of this current flow it will be clear that the voltage drop across two adjacent electrodes, separated by distance d, (shown in FIG. 1a) will be:

$$(\Delta V)_0^n = \left(\frac{d}{L}\right) V \quad (2)$$

the superscript n refers to a particular pair of adjacent electrodes and the subscript o refers to the undeformed state of the sensor, i.e., with the flexible tactile surface as shown by dotted lines 18. When an indentor 20 deforms flexible tactile surface 14, the compression of the fluid in the vicinity of the indentor 20 leads to an expansion of the fluid elsewhere. The system can be thought of as a constant volume system such that if the flexible membrane is indented in one area it will be expanded in another area (because the fluid filling the volume is incompressible). For indentations which are less than the total thickness of the fluid (under the undeformed tactile surface) the overall current flow through the fluid remains constant. The deformation by the indentor 20 of the flexible tactile surface 14 can be considered to cause a change in the local height $\pm \delta H$ where the local height is associated with a pair of adjacent conductors. The actual local height over one conductor may be slightly different from that over an adjacent conductor. However if the distance d is small enough this difference will be insignificant and the change in local height $\delta H$ can be considered the average change over the two adjacent conductors. The change in voltage across any two adjacent electrodes will be:

$$\Delta V^n = \left(\frac{d}{L}\right) \frac{1}{1 \pm \frac{\delta H}{H}} V \quad (3)$$

where $\delta H$ is the average local height at the pair of adjacent conductors. Using the definition that $\delta V^n = \Delta V^n - \Delta V_0^n$ equals the local change in voltage $\delta V^n$. Then $\delta V$ is approximately equal to $$\pm \frac{\delta H}{H} \times V$$

which is approximately equal to $$\pm \frac{\delta G}{G} \times V$$

where G is the impedance of the local circuit.

In the above-described preferred embodiment of the invention, a 1 KHz, 300 mV signal was applied to condutors 22a and 22b and individual pairs of conductors were probed by a digital volt meter 30. In order to eliminate ground loops and other potential problems, a high impedance audio transformer 28 was interposed between the voltmeter and the conductors. There was no observable noise in the impedance of the overall circuit was high enought that no appreciable current was drawn.

The results obtained are illustrated in FIGS. 2a through 2d as the dotted line shown in those drawings. In each drawing, the ordinate of each graph represents the change in voltage of a conductor pair with and without an indentation. The abscissa of each graph is the position location of the local conductor pairs which were as measured. Thus it can be seen that at the position of the vertical arrow (which corresponds to the position of indentor 20) there is an increase in the voltage drop between an adjacent pair of conductors equal to 4 millivolts.

An increase in voltage drop at the indentation is reasonable since the cross-sectional area of the fluid has been reduced at that point. Accordingly, where this cross-sectional area is reduced, the impedance to current flow is increased and thus the voltage drop across conductors would be greater. The reduction in cross-sectional area in the width W direction can be seen by referring to FIG. 1b in the immediate vicinity of the position of indentor 20 as it is clearly below the undeformed level of the tactile surface indicated at dotted line 18. Similarly, at other places on the tactile surface, the cross-sectional area will be greater than in the undisturbed shape due to the fact that fluid has been moved from the vicinity of the indentor to other areas in the constant volume system. Accordingly, those other areas will have less than normal resistance to fluid flow and therefore the voltage drop across their local adjacent electrodes should be less than the nominal undisturbed state. This is borne out by looking at positions 3 and 4 and 13 and 14 of FIG. 2a which indicate a voltage decrease (due to the negative sign) of approximately 1-2 millivolts. The position of the deformation caused by indentor 20 is clearly shown as existing at position 8.5 and the extent to which the indentor deforms the flexible tactile surface is indicated by the magnitude of the voltage change. A simple calibration will provide the deformation magnitude information.

Figure 2A:
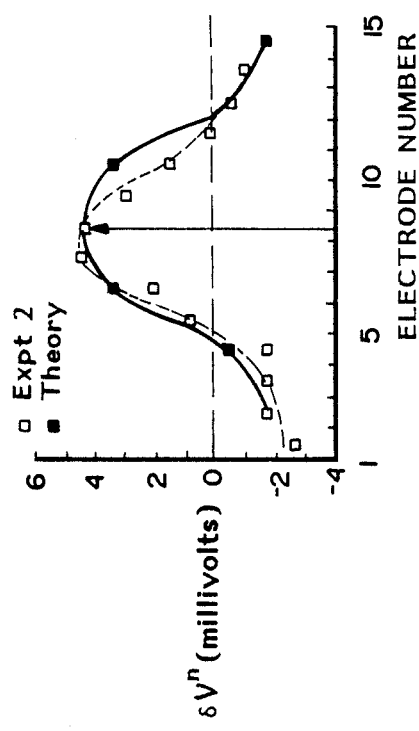
FIGS. 2a and 2b illustrate the response of the present invention to essentially central indentations.
Figure 2B:
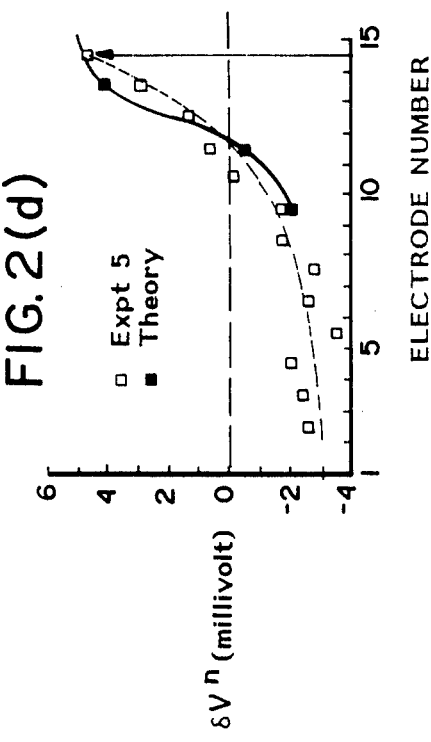
Figure 2C:
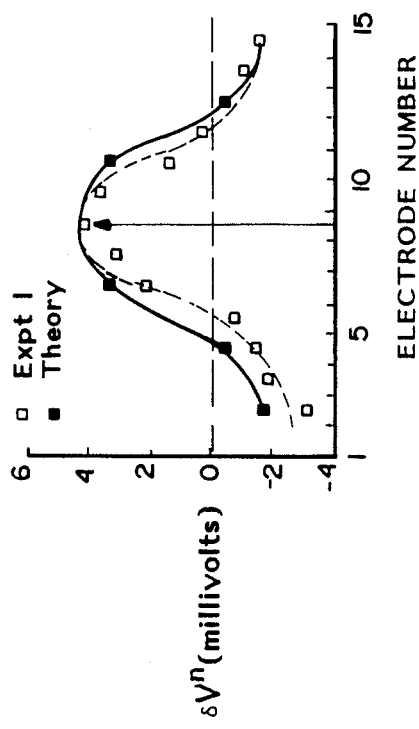
Figure 2D:
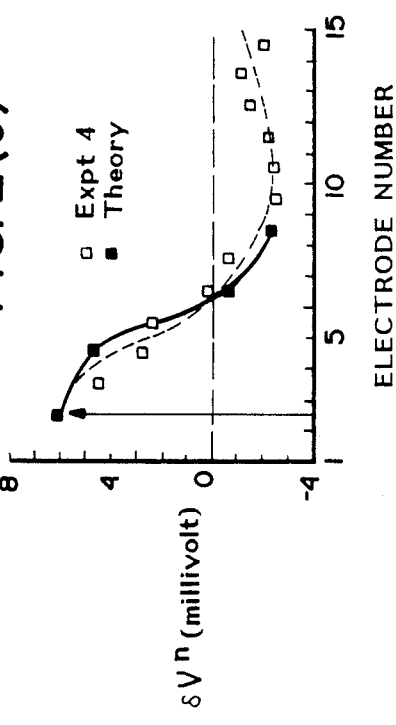

The nominal or undeformed voltage is indicated at zero voltage change by the horizontal dotted line. FIG. 2b is similar to FIG. 2a although it represents a different series of data readings with the same indentation position. FIG. 2c is an indication of sensitivity with the indentor 20 on the lefthand portion of the flexible tactile surface and FIG. 2d represents the situation in which the indentor 20 is at the righthand portion of the conductor array.

Obviously positions in the width or W direction of the indentor cannot be sensed by this sensor array. Only positions in the length or L direction (the direction of conductors spacing) can be determined. In the actual test, the precision of individual voltage measurements made by a digital voltmeter were $\pm 3\%$ and therefore the difference voltage had an uncertainty that was approximately $\pm 10\%$. In view of this uncertainty, the data agreed with the actual position of the indentor very nicely. No attempt was made to calibrate the force required to produce a given indentation which produced a given maximum voltage change (at the point of indentation) although this should be quite straightforward for those versed in the measurement art.

FIGS. 2a through 2d have the experimental values indicated by the open squares and theoretical values indicated by the solid diamonds. The theoretical values which should be expected from the combined liquid membrane system were developed using a finite element program, in specific the ANSYS program from Swanson Analysis Systems, Inc. The program used a numerical method to predict the deflection at points in a defined mechanical structure under a given set of loading conditions and constraints. The physical properties of materials used in the experimental sensor are defined in the program by their Young's moduli, E, and Poisson's ratio, v. The bulk modulus, k, is defined as:

$$k = \frac{E}{3(1 - 2v)} \quad (4)$$

Both the latex membrane and ethylene glycol liquid elements of the sensor structure were assumed to have Poisson's ratios approaching 0.5. For simplicity, a large value of k (approximately equal to $3.5 \times 10^6$ kPa) was used for both materials. The good agreement between the experimental and computed values in FIGS. 2a through 2d adequately justifies these assumptions. The computed results are a set of two-dimensional deflections corresponding to local values $H_{ij}$ and $\delta H_{ij}$. By summing over one of the subscript indicies, an average value of $\delta H$ is obtained that can be used with the previous equations to estimate $\delta V^n$. The calculated values are normalized to equal the peak measured $\delta V^n$ voltage. Only 8 points could be computed with the ANSYS program along any given cartesian axis. The impedance was estimated by assuming a constant specific resistance for the liquid and summing the displacement along a strip perpendicular to the assumed current flow. As a result, 7 values were obtained centered on the point of maximum displacement. The separation of each calculated value corresponds to two divisions (1.2 mm). These results as noted above are shown as the solid diamond dots in the FIGS. 2a through 2d and the solid curve is an interpolation to assist in the comparison to the experimental data. It can be seen that there was indeed good agreement between the experimental and the calculated data.

Based upon the above measurements, it appears that the resolution of this device is better than one division or 0.6 mm. This conclusion is drawn by examining the computed values of the deflection in FIGS. 2a and 2b. Displacement of the set of theoretical values by half a division relative to the experimental values could be clearly distinguished despite the fact that the full width at half height resolution of the device is 5 divisions or 3 millimeters. Indeed, using the interpolated experimental curve, it appears that the full width at half height is closer to 3.5-4 divisions.

The above multi-point impedance measurement system implies that images of impedance variation from any source, not simply membrane deformation, may be employed to obtain cross-sectional images. It is concluded that this class of micro structures may provide fine grain impedance images. Obviously, the sensitivity to indentation of the above system is governed by the extent to which the impedance in the overall fluid is locally affected by the indentor. A shallower or thinner the fluid layer with the same applied voltages would make the device more sensitive to a given indentation, i.e., the given indentation would provide a higher voltage change across the conductor pair associated with the indentation position. Sensitivity of position can be improved by having a greater number of parallel conductors with a consequent smaller spacing dimension, d. However, as d is reduced, a point will be reached where a further decrease does not provide any further sensitivity because the impedance increase of the local fluid will be spread over two or more conductor pairs.

Although the above embodiment was constructed to provide a proof of concept experimental device, it proved to be rugged and reliable lasting for periods of months with only limited care. It is certainly not necessary that the substrate be comprised of a ceramic material or that the conductors be photolithographically provided. Thus, many other plastic and alternative structures will be adaptable to the container device. Although a flat plate tactile sensor has been described, other embodiments are possible such as a "finger" sensor having the conductors spaced apart along a non-conducting finger with the flexible tactile surface at least partially surrounding the finger as well as extending along its length. Similarly, the flexible tactile surface can be any flexible material which is compatible with the conductive fluid chosen which itself can be chosen from a broad range of materials. In the present embodiment, however, ethylene glycol appears to be quite compatible with the latex tactile surface and the gold conductors. Further, although it was convenient to use a digital voltmeter and an isolating transformer, these are not necessary as any manner of measuring the voltage between the most spaced apart electrical conductors (22a and 22b) and then between individual pairs of conductors in the array 22 would be appropriate.

It is envisioned that a microprocessor could be programmed to measure the overall voltage drop applied to conductors 22a and 22b and then sequentially or simultaneously sample the individual voltage drop across each pair of conductors. Although an alternating current source has been shown connected to the furthest spaced apart conductors, a direct current could be applied, although after a period of time it would tend to polarize the partially conductive fluid reducing the usefulness of the system. The frequency of the electric signal applied to the outermost electrodes is not critical and any frequency could be utilized.

Because at least the above preferred embodiment of the present invention operates at a constant volume, measurement is essentially differential in nature, i.e., before deformation and during deformation. The change in voltage drop across pairs of conductors is always referenced to the pre-deformation voltage drop and thus the device can be automatically recalibrated in any position once the deformation has been removed. The constant volume and ease of recalibration serves as a further aid to accuracy of the above device.

In accordance with the above disclosure, many modifications and variations of the device will be obvious to those of ordinary skill in the art. Different materials, structures and components could be substituted for those shown in the exemplary embodiment. Accordingly, the present invention is not limited by the specific embodiment disclosed, but rather is limited only by the scope of the claims appended hereto.

I claim:

1. An impedance tactile sensor for providing an electrical indication of contact with the sensor, said tactile sensor comprising:
    a volume of an at least partially conducting fluid;
    means for containing said partially conducting fluid, said means including a flexible tactile surface;
    means for applying a voltage across a measurement length of said fluid causing local voltage drops in said fluid; and
    means for measuring any changes in local voltage drop, said changes defined as the difference between any local voltage drop without contact with said surface and any local voltage drop during contact with said surface.

2. An impedance tactile sensor for providing an electrical indication of contact with the sensor, said tactile sensor comprising:
   a volume of an at least partially conducting fluid;
   means for containing said fluid, said means having a flexible tactile surface to be contacted, said fluid having a constant volume;
   means for supporting an array of at least three conductors spaced apart in a direction substantially parallel to said tactile surface, two of said at least three conductors being spaced furthest apart;
   means for applying a voltage across said two spaced furthest apart conductors, and
   means for measuring any change in voltage drop across local pairs of conductors, with and without contact with said sensor, said change being the result of indentation of said tactile surface, where the magnitude of a change associated with each local pair of conductors is indicative of an average change in local fluid thickness associated with each local pair of conductors and therefore a change in the position of said flexible tactile surface at said local pair of conductors.

3. An impedance tactile sensor according to claim 2, wherein said means for containing comprises:
   a two-dimensional surface;
   a boundary means on said two-dimensional surface defining the periphery of said two-dimensional surface; and
   an elastic film means, attached to said boundary means, comprising said tactile surface.

4. An impedance tactile sensor in accordance with claim 3, wherein said boundary means comprises a rectangular boundary on said two-dimensional surface.

5. An impedance tactile sensor in accordance with claim 4, wherein said two-dimensional surface and said boundary means are comprised of densified $Al_2O_3$.

6. An impedance tactile sensor in accordance with claim 2, wherein said conductors are parallel to each other and are adjacent one another.

7. An impedance tactile sensor in accordance with claim 6, wherein said conductors comprise photolithographically defined strips of conductive material.

8. An impedance tactile sensor in accordance with claim 7, wherein said conductive material is gold.

9. An impedance tactile sensor in accordance with claim 2, wherein said measuring means measures the change in voltage drop across adjacent pairs of conductors.

10. An impedance tactile sensor in accordance with claim 2, wherein said at least partially conducting fluid comprises ethylene glycol.

11. An impedance tactile sensor for providing an electrical indication of contact with the sensor, said tactile sensor comprising:
    a volume of ethylene glycol;
    a means for containing said ethylene glycol comprising a substrate and rectangular boundary of densified $Al_2O_3$ with a flexible tactile surface said substrate, rectangular boundary and said tactile surface comprising a constant volume;
    a plurality of conductors photolithographically defined on said two-dimensional surface having two conductors which are spaced furthest apart;
    means for applying a voltage across said two spaced furthest apart conductors; and
    means for measuring any change in voltage drop across adjacent pairs of conductors with and without contact of said flexible tactile surface, where the magnitude of any voltage change across a local pair of conductors is indicative of the average change in local fluid thickness and therefore change in position of said flexible tactile surface.

12. A method of locating and characterizing contact with a flexible surface, including the steps of:
    providing a means for containing an at least partially conductive fluid with the containing means having at least a flexible tactile surface; means for applying a voltage across a measurement length of said fluid causing local voltage drops; means for measuring any changes in local voltage drops where said change is defined as the difference between any local voltage drop without contact with said tactile surface and any local voltage drop during contact with said tactile surface;
    measuring voltage drops with and without contact of said flexible tactile surface, for each pair of conductors;
    computing the local change in height of said tactile surface above a substrate for each pair of conductors in accordance with:

$$\Delta V^n = \left(\frac{d}{L}\right)\frac{1}{1 \pm \frac{\delta H}{H}} V$$

where n is the local pair of conductors being measured, $\Delta V^n$ is the change in local voltage drop associated with the nth pair of conductors, d is the spacing between the adjacent nth pair of conductors in a measurement direction, L is the distance between the spaced furthest apart conductors in said measurement direction, H is the local height of fluid above said substrate, $\delta H$ is the local change in height of the fluid at the nth pair of conductors, and V is the voltage applied to the spaced furthest apart conductors.

13. A method of locating and characterizing contact with a flexible surface, including the steps of:
    providing a means for containing an at least partially conductive fluid with said containing means having at least a flexible tactile surface;
    applying a voltage across a measurement length of said fluid causing local voltage drops;
    measuring any changes in local voltage drops where said change is defined as the difference between any local voltage drop without contact with said tactile surface and any local voltage drop during contact with said tactile surface, said any difference between said measured voltage drops without contact of said flexible tactile surface comprising an output indicative of contact with said tactile surface.

14. A method according to claim 13, wherein said providing step includes supporting an array of at least three conductors spaced apart in a direction substantially parallel to the tactile surface, two of said at least three conductors being spaced farthest apart, said applying step comprising applying a voltage across said two spaced farthest apart conductors, said measuring step comprising measuring voltage drops across local pairs of conductors wherein the magnitude of any change in voltage associated with the local pair of conductors is indicative of an average change in local fluid thickness and therefore indicative of a deflection of the flexible tactile surface at said local pair of conductors.

* * * * *